Aug. 25, 1964 F. KUHRT ETAL 3,146,318

SOUND-TRACK REPRODUCER FOR MOTION-PICTURE PROJECTORS

Filed Dec. 7, 1960 4 Sheets-Sheet 1

United States Patent Office 3,146,318
Patented Aug. 25, 1964

3,146,318

SOUND-TRACK REPRODUCER FOR MOTION-PICTURE PROJECTORS

Friedrich Kuhrt, Walter Engel, and Christian-Friedrich Wolf, all of Nurnberg, Germany, assignors to Siemens-Schuckertwerke Aktiengesellschaft, Erlangen, Germany, a German corporation Filed Dec. 7, 1960, Ser. No. 74,353
Claims priority, application Germany Dec. 12, 1959
8 Claims. (Cl. 179—100.2)

Our invention relates to apparatus for reproducing sound from magnetic sound tracks on tape, film, wire or the like magnetogram carriers in synchronism with the reproduction of motion pictures from films.

In one of its more particular, though not exclusive, aspects, our invention relates to sound-track reproducing apparatus for use with, or as part of, a projector for motion-picture films which, aside from the picture frames, carry a strip-shaped sound track along the frames.

For satisfactory quality of sonic reproduction, it has been necessary in such apparatus to have the sound track pass along a transducer head at uniform and accurately predetermined speed, and to provide suitable synchronizing equipment for causing the film projector to run at the particular, often undesirably high speed prescribed by the operation of the sound track. Such equipment, requiring a mechanical or electrical synchronization between the drive for the sound track and the film drive in the projector, involve a considerable amount of components and space and may become excessively susceptible to trouble. For the reproduction of sound simultaneously with the reproduction of narrow-gauge film, for example films of 8 mm. width, the sound track, as a rule, is recorded on a tape separate from the narrow-gauge film so that a separate sonic transducer and tape drive must be used, which renders the necessary synchronizing equipment still more disadvantageous.

It has also become known to place a sound track directly upon the narrow-gauge film and to combine the film projector with a transducer which senses the sound track at a given location ahead of the particular frame being projected at a time. On 8 mm. narrow-gauge film such a magnetic sound track is located between one edge of the frame sequence and the adjacent perforations of the strip. At this location there is just sufficient space for a track strip of 0.8 mm. width. The sensing of the sound track may be effected at a distance of 135 frames ahead of the frame being projected at a time, for example.

The known devices for reproducing sound from such a narrow-gauge film also require a synchronizing device between the sound reproducer and the projector drive. Generally, for securing a satisfactory tone quality, the synchronization is derived from the sonic transducer. That is, the drive for the picture projection is constrainedly synchronized in dependence upon the speed required in the transducing device. A satisfactory tone reproduction is afforded only when the film travels at constant speed. Any variations in film speed would make themselves felt as disagreeable sound fluctuation in the acoustic reproduction. Particularly during retarding and stopping of the film, as well as during the starting period, disagreeable howling noise would be inevitable.

While for the projection of standard film as used for commercial purposes, a uniformly high speed of film travel is always used, the narrow-film amateur is usually interested in having the film travel through the projector at desired other speeds than correspond to the standards, such as 16 frames per second, or 24 frames per second, for example. It must also be taken into account that the equipment available to the amateur, namely the film camera or the projector itself, are often unreliable with respect to accuracy of film travel. Furthermore, film projectors of the same or different makes or of different types differ from each other with respect to the film travel speeds. Even with one and the same projector, the speed of the film travel is often dependent upon temperature or is unstable for other reasons. This is because a constant-speed operation of such equipment would involve a considerable technological expenditure apt to render the equipment more costly than desirable for amateur use. Besides, amateurs usually do not place the high commercial requirements upon accuracy of uniform film travel. On the contrary, the amateur, as mentioned, considers it often desirable to have the possibility of changing the speed of film reproduction, or to afford reproduction with the film at standstill, or slow-motion or fast-motion reproduction for special effects.

For any such use, the available narrow-gauge motion picture films with sound track have heretofore been inapplicable. Aside from the fact that such sound-track motion-picture films greatly increase the cost of the necessary reproduction equipment, they also limited the reproduction to a strictly prescribed speed of film travel to secure satisfactory tone reproduction. Furthermore, such films, for the reasons just mentioned, prevented the amateur from saving film material in such cases where a slower speed of projection was desirable or sufficient.

It is an object of our invention to eliminate the above-mentioned shortcomings and deficiencies by securing a satisfactory acoustic reproduction of the sound track at different or varying speeds of the motion-picture film being projected. More specifically it is an object of our invention to permit the projection of a sound-track carrying motion-picture film, particularly narrow-gauge film, at less than the standard speed or even at standstill of the film, without appreciably clamping the pitch of the acoustic reproduction.

In accordance with a feature of our invention, we provide the sound-track reproducing device with a rotatable transducer head carrying one or more Hall-voltage generating sensing members, the periphery of the transducer head being located along the travel path of the sound-track carrier and engageable by the carrier for sensing the magnetically recorded signals. We further provide means for rotating the transducer head relative to the sound-track path in a direction and at a speed of rotation depending upon the departure from a given value of the travelling speed at which the motion-picture film passes through the projector. As a result, the speed of relative motion between the sound track and the rotatable transducer head is kept at a constant value regardless of fluctuations or other changes in projecting speed.

The invention, just briefly described, is of advantage for the above-mentioned synchronization between a film projector and a sound-track reproducer operating with a magnetogram tape separate from the film, as well as for the reproduction of sound tracks from motion-picture films directly carrying such a track. Relative to the latter type of equipment, the invention affords structurally combining the sound reproducer with the film projector to a single unit that does not require an intricate mechanical or electrical synchronization of the respective drives. It is then only necessary to have the film, before entering into the projecting picture window or lens system of the projector, travel through the sonic reproducer in which the rotational transducer head is mounted at an accurately defined frame distance from the picture window.

The above-mentioned objects, advantages and features of our invention will be more fully apparent from the following description of the embodiments of apparatus according to the invention illustrated by way of example on the accompanying drawing, in which.

Figures 1, 3:
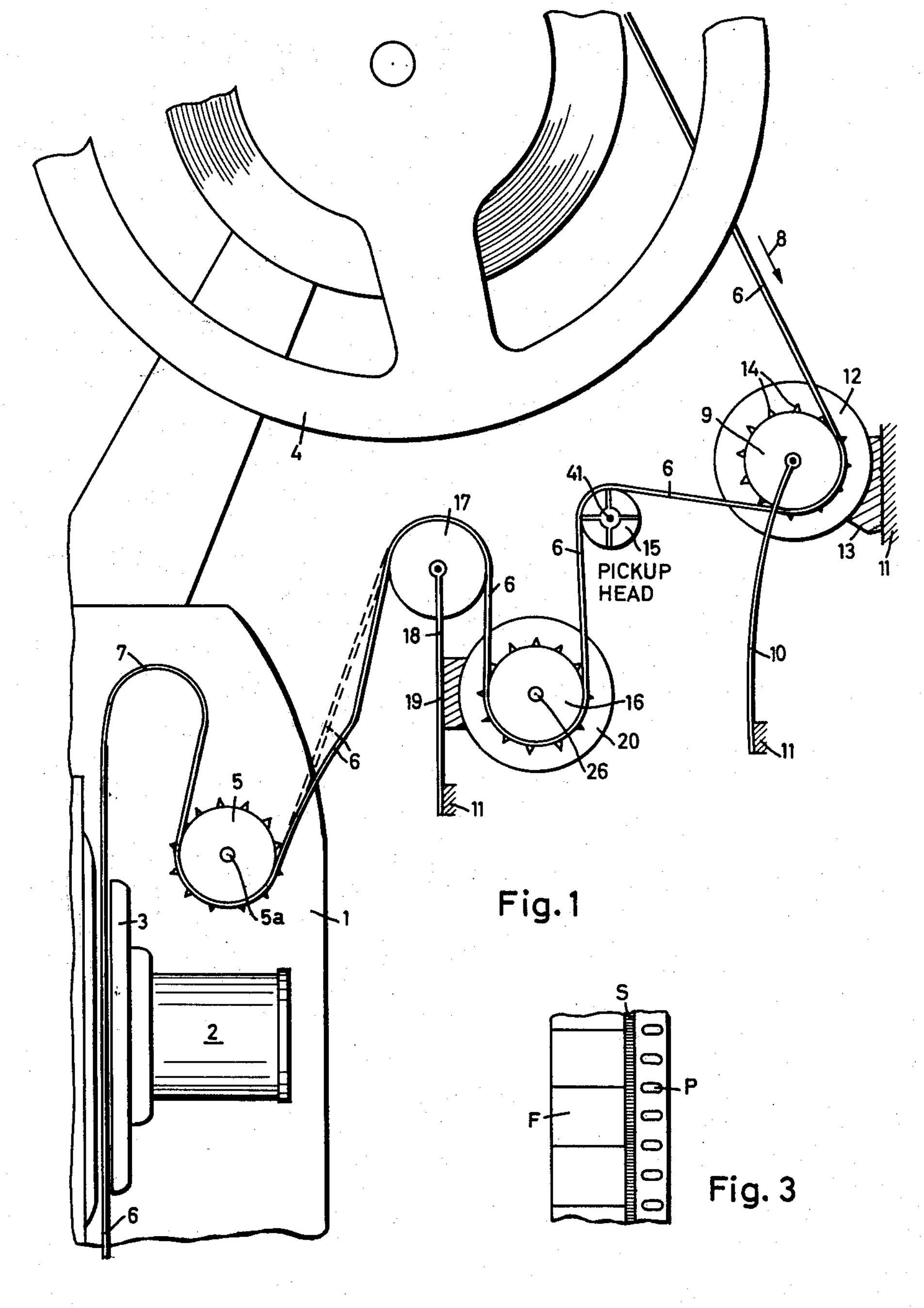
FIG. 1 illustrates schematically a motion-picture projector and sonic reproducer.
FIG. 3 shows a narrow-gauge film with sound track as used in the apparatus.

The illustrated projector serves for the projection of 8 mm. film with simultaneous acoustic reproduction of a sound track extending along the film between the picture frames and the perforations. Such a film, as generally customary, is shown in FIG. 3 where the sound track is denoted by S, the picture frames are denoted by F, and the perforations by P. At a picture width of 8 mm., the width of the sound track S is about 0.8 mm.

It will be understood that in FIG. 2 various components are shown drawn apart and that the relative sizes of the individual gears and other parts of the equipment are distorted for the purpose of illustration, the correct correlation of the components being described in the following.

The narrow-film projector 1 shown in FIG. 1 comprises a lens system 2 behind which a film-guiding slide member 3 is located. It will be understood that the picture frames when passing through the guide 3 become temporarily located in front of the picture window on the axis of the objective lens system 2. The film is wound off a spool 4 and is advanced by means of a sprocket roller 5. The film 6 forms a loop 7 between the sprocket roller 5 and the guide 3, because the sprocket roller 5 rotates at constant speed, whereas the advancing motion of the film within the guide 3 is intermittent.

After the film leaves the spool in the direction of the arrow 6, it passes first over a sprocket roller 9. The roller 9 is journalled on a flexible spring member 10 rigidly secured to a stationary support 11 which forms part of the supporting structure of the apparatus. Due to the spring member 10, the sprocket roller 9 can move toward the left under the pulling force exerted upon it by the travelling film 6. When in the illustrated position of rest, a brake drum coaxially joined with the sprocket roller 9 rests against a fixed brake member 13. The purpose of this braking device is to immediately stop the sprocket roller 9 upon any sudden reduction in film tension. The sprocket teeth 14 of roller 9, entering into the perforations of the film, serve to reliably stop the film in such an event.

On its further travel, the film strip 6 passes about the peripheral surface of a rotatable transducer head 15 equipped with Hall-voltage generating sensors. Suitable as transducer heads for the purposes of the invention are those disclosed and claimed in our Patent 3,071,654, Transducer for Magnetic Recordings, assigned to the assignee of the present invention. However, a transducer head for use with the present invention will also be described herein below with reference to FIGS. 5 to 7 of the accompanying drawings.

The magnetic sound track may be located on the smooth side of the film, i.e., not on the side of the photo-emulsion, and this smooth side is preferably placed into contact engagement with the rotatable transducer head 15. The diameter of the transducer head 15 is preferably so chosen that a good and intimate contact with the usual film strip is secured. This is particularly important in view of the fact that, when motion-picture films are repeatedly reproduced, the perforations become mechanically stressed so that the film material may become warped at these locations which result in some degree of waviness of the film. When sensing the sound track of such a film in taut condition, such waviness may impair the sensing operation so that pinch rollers of high contact pressure would have to be used. This, however, is not necessary with a drum-shaped transducer head as used according to the invention, because it avoids the occurrence of such waviness and acts to relieve the film tension to such an extent that pinch rollers or similar devices for pressing the film against the transducer head can be dispensed with or need be given an only small size or small pressing force.

Figure 4:
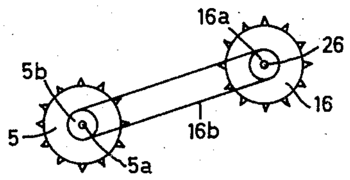
FIG. 4 illustrates a modified detail of the apparatus.

After passing beyond the transducer head 15, the film 6 is guided about a peripheral portion of a guide roller 16 which rotates in synchronism with the sprocket roller 5 of the projector proper. For this purpose, the guide roller 16 may be connected with the sprocket roller 5 or another suitable driving gear of the projector 1. For example, a direct connection may be used between the driving mechanism of the projector and the shaft 26 of the guiding drum 16, or any suitable mechanical coupling member, such as a sprocket chain, a flexible shaft, a rope chain, or the like may be provided between the shaft *5a* of sprocket roller 5 and the shaft 26 of guide roller 16. Thus, in FIG. 4 there is shown a driving belt or chain *16b* trained over respective roller *16a* on shaft 26 and *5b* on shaft *5a*. Such a mechanical coupling is particularly advantageous if the magnetogram carrier consists of a tape or other member separate from the motion-picture film proper.

In the embodiment according to FIG. 1, however, such a synchronization by additional means is dispensed with. In this case, the guide roller 16 is driven in synchronism with the projector operation simply by being pulled along by the film 6, for which purpose the guide roller 16 is provided with sprocket teeth. This constitutes a particularly simple means of synchronizing the guide roller 16 with the driving sprocket 5 of the projector, provided care is taken to prevent the guide roller 16 from ever performing a leading motion relative to the sprocket roller 5. For this purpose, the illustrated embodiment is provided with a brake controlled by a roller 17. The roller 17 is journalled on a bracket 18 which is inherently resilient or is additionally biased by a spring (not illustrated). A brake shoe 19 is engageable with a brake drum 20 coaxially mounted on the shaft 26 of the guide roller 16 as to rotate together therewith. When the film 6 is being pulled by rotation of the sprocket roller 5, the film is tautened and the roller 17 moves toward the left. In reality, the distance between the rollers 5 and 17 is larger than apparent from FIG. 1, so that the film 6 leaves the roller 17 at a smaller angle relative to the horizontal direction, whereby a correspondingly stronger pulling force toward the left is exerted upon the roller 17. This lifts the brake shoe 19 from the drum 20 so that the film travel is subjected to only slight friction. However, as soon as the film becomes less taut, the roller 17 is moved by the spring force of bracket 18 toward the right so that the brake shoe 19 is again effective, thereby retarding the rotation of drum 20 and the roller 16.

Figure 2:
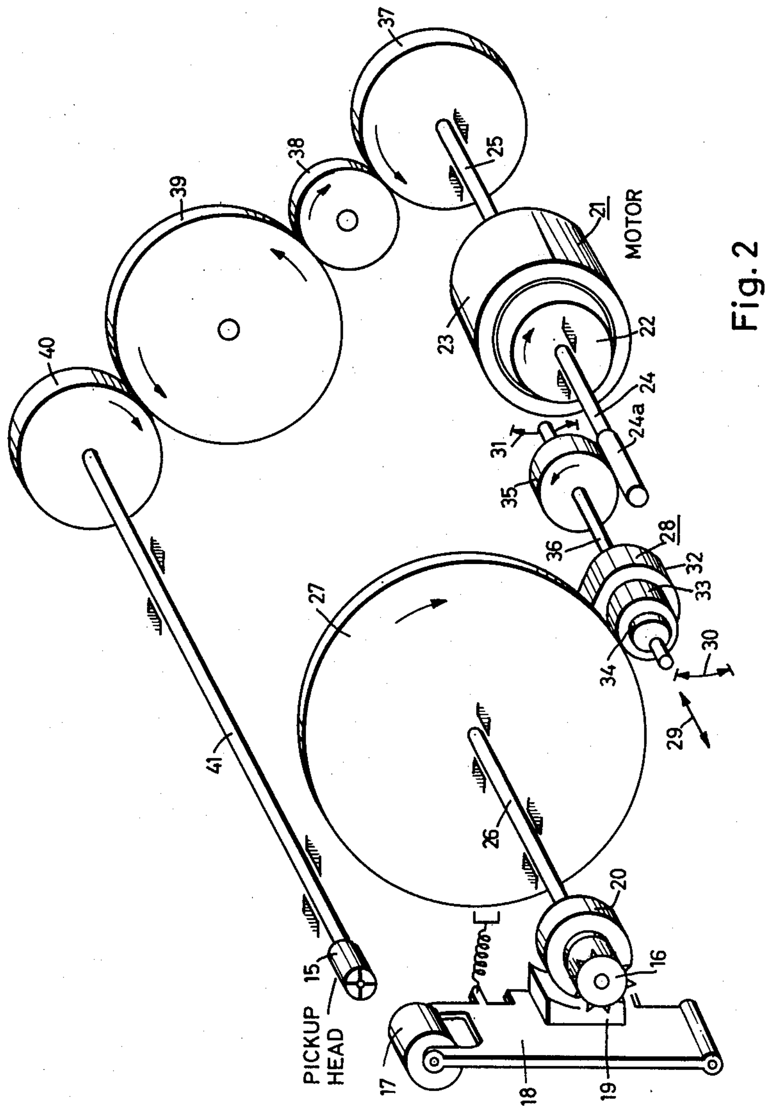
FIG. 2 is a schematic and perspective view of part of the same apparatus.

Such possibility of braking the guide roller 16 is necessary because this roller is operatively connected with a differential transmission and an auxiliary motor (21 in FIG. 2). This motor, which corresponds to the drive motor in an ordinary tape recorder and satisfies the constancy requirements demanded by the quality of acoustic reproduction, acts upon the differential mechanism and is thereby connected, on the one hand, with the roller 16, on the other hand, with the rotatable transducer head 15. As a result, an accurately defined and predetermined relative speed is maintained between the film strip 6 and the peripheral surface of the transducer head 15. That is, when the rotatable transducer head 15 is at standstill, the guide roller 16 is rotated by the motor at a speed corresponding to the prescribed sensing speed of the sonic reproducer; but when the guide roller 16 is slowed down, the transducer head 15 commences to rotate in a direction opposed to the travelling direction of the film strip so that the relative speed between the sound track and peripheral surface of the transducer head remains constant.

By making the sensing speed of the sonic reproducer adjustable, the film speed in the projector can be chosen at will so as to basically correspond to the frame sequence of 16, 24 frames per second, or any other higher or lower number. When using the apparatus, this sensing ratio can be preadjusted, whereafter the film can be driven through the projector at any desired speed within a certain range, without change in pitch of the acoustic reproduction.

The above-mentioned differential driving mechanism for the guide roller 16 and the rotatable transducer head 15 will now be described with reference to FIG. 2.

The differential mechanism exemplified in FIG. 2 comprises the above-mentioned electric motor 21. Not only the rotor 22 but also the stator housing 23 of the motor is rotatable. The rotor 22 drives a shaft 24. The rotatable housing 23 is firmly joined with another shaft 25 for driving the latter. Shafts 24 and 25 are coaxially aligned. The differential action of such a drive is apparent from the fact that when the housing 23 is kept arrested, the rotor 22 and shaft 24 rotate at the full uniform speed, whereas conversely, when the rotor 22 is kept arrested, the housing 23 with shaft 25 rotates at the full speed but in the opposite direction of rotation.

The above-described guide roller 16 is rigidly seated on its shaft 26 which also carries a gear disc 27. The disc 27 is driven from the rotor shaft 24 through an intermediate speed-change gear set 28 which is axially displaceable, as indicated by a double-headed arrow 29, and which can be turned within a given angular range according to the double-headed arrows 30 and 31. This permits selecting one of three friction wheels 32, 33, 34 of graduated diameters to be placed into driving engagement with the periphery of the disc 27. Consequently, the driving torque can be transmitted from shaft 24 through friction gears **24*a* and 35 to the shaft 36 from which the disc 27** can be driven at any one of three available speeds. This affords setting the film drive for a basic speed of 16 or 24 frames per second as well as to a desired third speed, as described above.

A gear 37, driven from the stator housing 23 of the motor 21, drives intermediate gears 38 and 39 of which the latter meshes with a gear 40 on the shaft 41 of the transducer head 15.

As described, the brake shoe 19 acting upon the drum 20 is controlled by the deflecting motion of the roller 17 journalled on a yieldingly mounted bracket 18. In many cases, however, it is desirable to avoid excessive wear of the friction-wheel drive from rotor 22 to the roller 16 by having the brake directly act upon the rotor shaft 24 or by braking the roller 16 simultaneously with the rotor 22.

The diameter of the rotating transducer head 15 is preferably not larger than 30 mm. for an 8 mm. film. When the diameter of the transducer head is too large, the above-mentioned waviness of the film strip may impair the quality of the magnetic sensing operation. On the other hand, the size of the diameter is downwardly limited by the stiffness of the film, because, if the film is forced to become excessively curved about two small a radius, it can no longer uniformly follow such curvature, thus likewise impairing the reliability of obtaining an intimate contact with the transducer head. It is advisable to provide a predetermined position of rest for the angular position of the rotatable transducer head 15 so that when the transducer head is at standstill, a single particular sensing gap with the Hall plate located therein is in proper sensing relation to the film tape, such arresting device being described in our above-mentioned Patent No. 3,071,654.

An essential distinction of apparatus according to the invention from devices known for comparable purposes, is the fact that the speed of film travel through the projector is not primarily determined by the constant-speed drive motor of the sound reproducing device, but that, conversely, the travel of the magnetogram carrier is controlled directly or by intermediate means from the film-projecting speed.

Since the relative motion between the magnetogram carrier and the sensing surface of the transducer head may be very slight so that the dimensions of the transducer head must be small, the desired operation can be satisfactorily realized only when using Hall-voltage generators as signal-sensors. If one attempted to use the known inductive transducer heads for such purposes, it would be extremely difficult to devise practically useful devices in acceptable geometric dimensions. For that reason, the present invention requires providing the transducer head with the above-mentioned Hall-voltage generators.

The transducer head according to FIGS. 1 and 2 is shown more in detail in FIGS. 5, 6 and 7, to which reference will be made presently.

Figure 5:
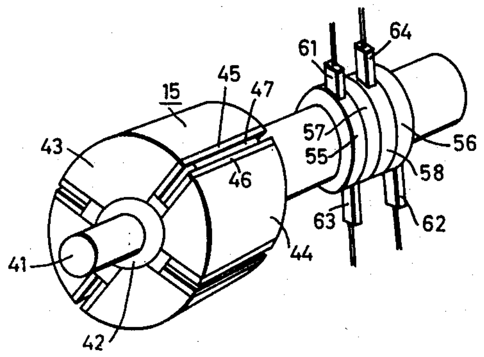
FIG. 5 illustrates the transducer head of the apparatus.
Figure 6:
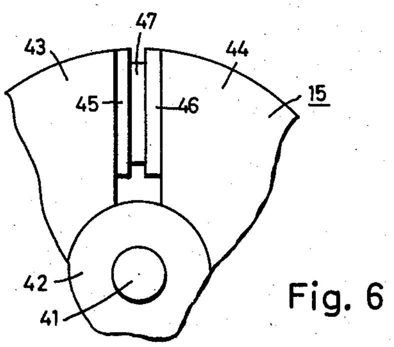
FIG. 6 is a schematic and perspective view of the same transducer head.

The transducer head has a hub portion 42 of brass or other non-magnetizable material mounted on the transducer shaft 41 and rigidly joined with four sectors of which two adjacent ones are denoted in FIGS. 5 and 6 by 43 and 44 respectively. These sectors may also consist of non-magnetic material and may be integral with the hub portion 42 if desired. Each two adjacent sectors 43 and 44 are peripherally spaced from each other so as to form an interstitial radial gap. In this manner the transducer head is provided with a total of four radial gaps.

Located in each gap are two ferromagnetic members 45 and 46 of high permeability consisting preferably of ferrite. These are joined with the respective segments 43 and 44 in face-to-face relation and form between each other a narrow sensing gap of a few microns, for example less than 5 microns, width. Located in the gap and filling its entire width is a Hall plate 47 of semiconductor material. The plate preferably consists of a Welker semiconductor, consisting of a binary compound of respective elements from the third and fifth groups of the periodic system according to U.S. Patent No. 2,798,989. Best suitable for the purposes of the invention are Hall plates of indium antimonide (InSb) or indium arsenide (InAs).

Figure 7:
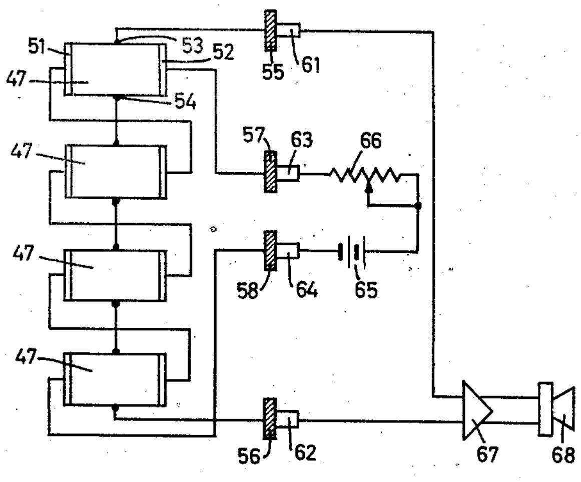
FIG. 7 shows a schematic circuit diagram of the transducer head.

As shown in FIG. 7, the plate has a substantially rectangular shape. It may be produced as a wafer or simply by depositing a coating of the semiconductor material upon the surface of one of the two ferrite core members 45, 46. Each of the four Hall plates 47 is provided with two terminal electrodes 51 and 52 extending along the respective narrow edges of the rectangular plate. Each plate is further provided with two probe electrodes 53 and 54 located on the respective long sides midway between the terminal electrodes 51 and 52.

Relative to the probe or Hall electrodes 53 and 54, all four plates 47 located in the four sensing gaps of the transducer head are connected in series between two slip rings 55 and 56. Relative to the terminal electrodes 51 and 52, all four plates are likewise shown series-connected between two slip rings 57 and 58. The four slip rings are engaged by respective contact brushes 61, 62, 63 and 64. Energizing current is passed through all four Hall plates 47 from a current source 65 through an adjusting rheostat 66 and through the slip rings 57 and 58. When no magnetic signal of the magnetogram carrier is in the vicinity of any one of the four sensing gaps so that no magnetic field is active upon the Hall plates, the two Hall electrodes 53 and 54 of each Hall plate have the same potential so that no output voltage appears at slip rings 55, 56 and contact brushes 61, 62. However, when any one of the sensing gaps is sufficiently close to a magnetic signal on the magnetogram carrier, it becomes subjected to the magnetic field of the signal. The magnetic flux then passes through the ferrite core plates 45, 46 and through the Hall plate 47. As a result, the two Hall electrodes of the particular Hall plate thus acted upon assume respectively different potentials so that an output voltage appears at contact brushes 61 and 62. This output voltage is impressed upon an amplifier 67 whose output is applied to a loudspeaker 68.

The minimum number of uniformly distributed sensing gaps in the transducer head depends upon the angle of wrap of the magnetogram carrier about the transducer head. Four such gaps, as illustrated in FIG. 5, are sufficient for a 90° angle of wrap. With a greater angle of wrap, only two such gaps with respective two Hall plates may be sufficient, or a single diagonal gap in which a single Hall plate is located. However, the number of gaps may be increased beyond the just-mentioned minimum. It will be understood that the various other modifications of transducer heads disclosed in our Patent No. 3,071,654 may also be used for the purposes of the present invention.

Figure 8:
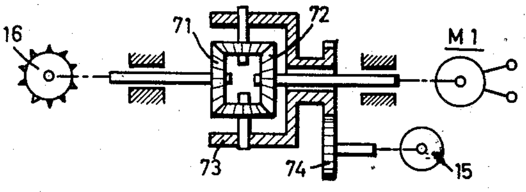
FIG. 8 shows schematically a modified differential drive applicable in apparatus otherwise corresponding to the preceding illustrations.

While according to a preferred feature of our invention the differential action of the drive for reversibly rotating the transducer head is obtained by using an electric motor whose rotor and stator components are both rotatable as described above with reference to FIGS. 1 and 2, the desired differential driving action upon the rotatable transducer head may also be obtained by means of other known differential devices. For example, FIG. 8 shows schematically an ordinary differential gear whose two coaxial bevel gears 71 and 72, constituting the two input members of the mechanism, are driven from the above-mentioned guide roller 16 (or the drive roller 5) and from a constant speed motor M1, respectively. The motor M1 is of the type used for magnetic tape recorders and may be mounted in the ordinary manner, namely so that only its rotor will rotate for driving the gear 72. The orbit member 73 of the differential gear mechanism is geared at 74 to the shaft of the rotatable transducer head 15. As long as the pilot member 16 rotates accurately at the same speed as the motor M1, the transducer head 15 remains at rest. When the pilot member 16 rotates faster or more slowly than the speed set by the motor M1, the transducer head is rotated in one or the other direction at a speed corresponding to the speed difference between member 16 and motor M1.

Figure 9:
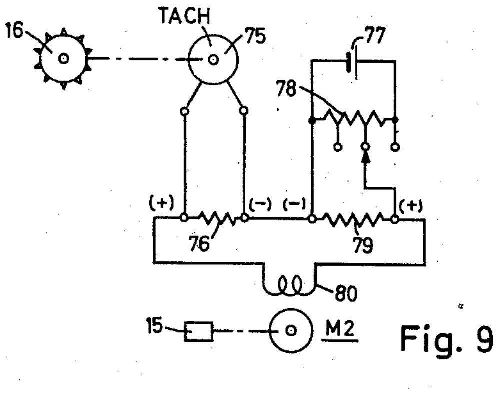
FIG. 9 is a schematic circuit diagram of another differential drive for such apparatus.

According to FIG. 9, the differential driving action upon the transducer head 15 is produced electrically. The pilot member 16 (or the drive roller 5) drives a tachometer generator 75 which impresses upon a resistor 76 a voltage varying in accordance with the speed of pilot member 16. A source of constant voltage 77, connected to a potentiometer 78, impresses upon another resistor 79 a selected constant preference voltage corresponding to the desired normal film speed of the projector. The two resistors 76 and 79 are interconnected in series opposition to act upon the field winding 80 of a reversible motor M2. This motor drives the transducer head 15 in a direction and at a speed corresponding to the difference between the reference voltage 79 and the pilot voltage 76.

It will thus be seen that our invention permits of a variety of modifications and can readily be given embodiments, by those skilled in the art, other than particularly illustrated and described herein, without departing from the essential features of the invention and within the scope of the claims annexed hereto.

We claim:

1. For use with a motion-picture projector of variable film speed, an apparatus for reproducing sound from a strip-type magnetogram carrier on the film strip in correlation to the film speed of the projector, comprising guide means defining a travel path for the magnetogram carrier, a rotatable transducer head having a cylindrical structure peripherally engageable with the carrier on said path and having Hall-voltage generator means joined with said structure for providing an output voltage in response to the magnetic sound track of said carrier as the carrier travels on said path, said Hall-voltage generator means including a plurality of semiconductor wafers extending radially from the interior of said cylindrical structure to its cylindrical periphery, each of said wafers having two Hall-voltage electrodes radially spaced from each other at the respective inward and outward edges of said wafer and having two current-supply electrodes at the respective radial edges, a rotatable guide member having a variable speed corresponding to said film speed, constant-speed reference means to provide a reference speed corresponding to the desired sensing speed of said transducer head, and reversible drive means connecting said constant-speed means and said guide member in differential relation to each other with said rotatable transducer head for rotating said head in accordance with the difference between the projector film speed and the reference speed, whereby the sensing speed of said transducer head is kept constant regardless of variations in film speed.

2. For use with a motion-picture projector of variable film speed, an apparatus for reproducing sound from a strip-type magnetogram carrier on the film strip in correlation to the film speed of the projector, comprising guide means defining a travel path for the magnetogram carrier, said guide means comprising a rotatable guide member engageable with the sound-track carrier and operatively connected when in operation with the projector to rotate at a variable pilot speed corresponding to the projector film speed, said guide means further comprising a rotatable transducer head having a cylindrical structure peripherally engageable with the carrier and having Hall-voltage generator means joined with said structure for providing an output voltage in response to the magnetic sound track of said carrier as the carrier travels on said path past said head, said Hall-voltage generator means including a plurality of semi-conductor wafers extending radially from the interior of said cylindrical structure to its cylindrical periphery, each of said wafers having two Hall-voltage electrodes radially spaced from each other at the respective inward and outward edges of said wafer and having two current-supply electrodes at the respective radial edges, constant-speed reference means, reversible drive means connecting said constant-speed reference means and said variable-speed guide member in differential relation to each other with said rotatable head for rotataing said head in accordance with the difference between pilot speed and reference speed, whereby the sensing speed of said head relative to the travelling carrier is kept constant regardless of changes in film speed.

3. For use with a motion-picture projector of variable film speed, an apparatus for reproducing sound from a strip-type magnetogram carrier on the film strip in correlation to the film speed of the projector, comprising guide means defining a travel path for the magnetogram carrier, said guide means comprising a rotable guide member engageable with the sound-track carrier and operatively connected when in operation with the projector to rotate at a variable pilot speed corresponding to the projector film speed, said guide means further comprising a rotatable transducer head having a cylindrical structure peripherally engageable with the carrier and having Hall-voltage generator means joined with said structure for providing an output voltage in response to the magnetic sound track of said carrier as the carrier travels on said path past said head, said Hall-voltage generator means including a plurality of semiconductor wafers extending radially from the interior of said cylindrical structure to its cylindrical periphery, each of said wafers having two Hall-voltage electrodes radially spaced from each other at the respective inward and outward edges of said wafer and having two current-supply electrodes at the respective radial edges, a constant-speed motor to provide a constant reference speed and differential transmission means connecting said motor and said pilot member in differential relation to each other with said transducer head for rotating said head in accordance with the difference between pilot speed and reference speed, whereby the sensing speed of said head relative to the travelling carrier is kept constant regardless of changes in film speed.

4. For use with a motion-picture projector of variable film speed, an apparatus for reproducing sound from a strip-type magnetogram carrier on the film strip in correlation to the film speed of the projector, comprising guide means defining a travel path for the magnetogram carrier, said guide means comprising a rotatable guide member engageable with the sound-track carrier and operatively connected when in operation with the projector to rotate at a variable pilot speed corresponding to the projector film speed, said guide means further comprising a rotatable transducer head having a cylindrical structure peripherally engageable with the carrier and having Hall-voltage generator means joined with said structure for providing an output voltage in response to the magnetic sound track of said carrier as the carrier travels on said path past said head, said Hall-voltage generator means including a plurality of semiconductor wafers extending radially from the interior of said cylindrical structure to its cylindrical periphery, each of said wafers having two Hall-voltage electrodes radially spaced from each other at the respective inward and outward edges of said wafer and having two current-supply electrodes at the respective radial edges, a constant-speed motor to provide a desired reference speed, said motor having an armature member and a housing member both of which are rotatable, one of said two motor members being mechanically connected with said pilot member to be rotated thereby, and the other motor member being drivingly connected with said transducer head for rotating said head in accordance with the difference between pilot speed and reference speed, whereby the sensing speed of said head relative to the travelling carrier is kept constant regardless of changes in film speed.

5. With a projector for motion-picture films having a sound track on the film, said projector having a film drive of variable speed, the combination of apparatus for acoustically reproducing said sound track comprising film guide means mounted on said projector ahead of the projecting location thereof so as to define a film travel path, a rotatable transducer head having a cylindrical structure peripherally engageable with the film on said path and having Hall-voltage generator means joined with said structure for providing an output voltage in response to the sound track as the film travels on said path past said head, said Hall-voltage generator means including a plurality of semiconductor wafers extending radially from the interior of said cylindrical structure to its cylindrical periphery, each of said wafers having two Hall-voltage electrodes radially spaced from each other at the respective inward and outward edges of said wafer and having two current-supply electrodes at the respective radial edges, constant-speed reference means, reversible drive means connecting said constant-speed means and said variable-speed drive of said projector in differential relation to each other with said rotatable transducer head for rotating said head in accordance with the difference between the projector film speed and the reference speed, whereby the sensing speed of said transducer head is kept constant regardless of variations in film speed.

6. Apparatus for reproducing a sound track from a motion-picture film as set forth in claim 5, comprising brake means engageable with the film on said path at a location ahead of said transducer head, and film-tension responsive control means for actuating said brake means to retard the film travel in response to loss of proper film tension.

7. With a projector for motion-picture films having a sound track on the film, said projector having a film drive of variable speed, the combination of apparatus for acoustically reproducing said sound track comprising film guide means mounted on said projector ahead of the projecting location thereof so as to define a film travel path, a rotatable guide member journalled along said path and engageable with the film so as to be entrained thereby when the film is being advanced by said film drive, a rotatable transducer head having a cylindrical structure peripherally engageable with the film on said path and having Hall-voltage generator means joined with said structure for providing an output voltage in response to the sound track as the film travels on said path past said head, said Hall-voltage generator means including a plurality of semiconductor wafers extending radially from the interior of said cylindrical structure to its cylindrical periphery, each of said wafers having two Hall-voltage electrodes radially spaced from each other at the respective inward and outward edges of said wafer and having two current-supply electrodes at the respective radial edges, constant-speed reference means, reversible drive means connecting said constant-speed means and said guide member in differential relation to each other with said rotatable transducer head for rotating said head in accordance with the difference between the projector film speed and the reference speed, whereby the sensing speed of said transducer head is kept constant regardless of variations in film speed.

8. Apparatus for reproducing a sound track from a motion-picture film as set forth in claim 7, comprising a brake for stopping said guide member, said film guide means comprising a resiliently displaceable roller engageable by the film on said path so as to be displaced by the film tension during normal travel of the film, said roller being connected to said brake for lifting said brake during normal film travel and actuating it upon loss of proper film tension.

References Cited in the file of this patent

UNITED STATES PATENTS

| | | |
|---|---|---|
| 2,866,013 | Reis | Dec. 23, 1958 |
| 2,909,616 | Marty | Oct. 20, 1959 |
| 3,037,092 | Neumann et al. | May 29, 1962 |